United States Patent
Brown et al.

(10) Patent No.: US 7,149,296 B2
(45) Date of Patent: Dec. 12, 2006

(54) PROVIDING ACCOUNT USAGE FRAUD PROTECTION

(75) Inventors: Michael Wayne Brown, Georgetown, TX (US); Joseph Herbert McIntyre, Austin, TX (US); Michael A. Paolini, Austin, TX (US); James Mark Weaver, Austin, TX (US); Scott Lee Winters, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 927 days.

(21) Appl. No.: 10/022,165

(22) Filed: Dec. 17, 2001

(65) Prior Publication Data

US 2003/0112942 A1 Jun. 19, 2003

(51) Int. Cl.
*H04M 15/00* (2006.01)
*H04M 17/00* (2006.01)
*H04M 3/00* (2006.01)

(52) U.S. Cl. ............ 379/145; 379/114.04; 379/114.14; 379/189

(58) Field of Classification Search ........... 379/114.04, 379/144.03, 145, 188–189, 114.14; 713/168, 713/200; 705/68–69, 38; 235/379, 380; 726/3–4, 7, 17–21
See application file for complete search history.

(56) References Cited

U.S. PATENT DOCUMENTS

| | | | |
|---|---|---|---|
| 5,206,899 A | 4/1993 | Gupta et al. ................. 379/120 |
| 5,381,467 A | 1/1995 | Rosinski et al. ........ 379/121.01 |
| 5,386,104 A * | 1/1995 | Sime ........................... 235/379 |
| 5,499,288 A | 3/1996 | Hunt et al. .................... 379/88 |
| 5,602,907 A | 2/1997 | Hata et al. ............. 379/114.22 |
| 5,673,404 A | 9/1997 | Cousins et al. ............. 395/347 |
| 5,754,633 A | 5/1998 | Levy ...................... 379/114.21 |
| 5,790,637 A | 8/1998 | Johnson et al. ................ 379/67 |
| 5,805,680 A | 9/1998 | Penzias ....................... 379/118 |
| 5,822,411 A | 10/1998 | Swale et al. ........... 379/114.22 |
| 5,859,900 A | 1/1999 | Bauer et al. ............ 379/114.21 |
| 5,872,834 A | 2/1999 | Teitelbaum ............... 379/93.03 |
| 5,907,142 A * | 5/1999 | Kelsey ........................ 235/380 |
| 5,915,001 A | 6/1999 | Uppaluru .................. 379/88.22 |
| 5,937,044 A | 8/1999 | Kim |
| 5,940,476 A | 8/1999 | Morganstein et al. .... 379/88.02 |

(Continued)

FOREIGN PATENT DOCUMENTS

EP 0585004 A2 3/1994

(Continued)

OTHER PUBLICATIONS

WPAT Derwent 1994-067503.

(Continued)

*Primary Examiner*—Binh K. Tieu
(74) *Attorney, Agent, or Firm*—Mark S. Walker; Amy J. Pattillo

(57) ABSTRACT

A method, system, and program providing identification usage fraud protection are provided. A context for a use of an identification via a communication line is detected at a fraud protection service. The context for use of the identification is analyzed in view of multiple previous uses of the identification. A level of suspicion of fraudulent use of the identification is specified according to the analysis of the context. Depending on the level of suspicion, further use of the identification may require additional authentication or may be barred. The identification may include a user name, an account number, a password, or other identifier that may be utilized to represent an individual in accessing products and services.

28 Claims, 8 Drawing Sheets

U.S. PATENT DOCUMENTS

| | | | |
|---|---|---|---|
| 5,943,405 A | 8/1999 | Morikawa et al. | 379/118 |
| 5,946,654 A | 8/1999 | Newman et al. | 704/246 |
| 5,978,450 A | 11/1999 | McAllister et al. | 379/88.02 |
| 6,038,305 A | 3/2000 | McAllister et al. | 379/207 |
| 6,047,051 A | 4/2000 | Ginzboorg et al. | 379/130 |
| 6,058,364 A | 5/2000 | Goldberg et al. | 704/252 |
| 6,101,242 A | 8/2000 | McAllister et al. | 379/88.02 |
| 6,122,357 A | 9/2000 | Farris et al. | 379/207 |
| 6,157,707 A * | 12/2000 | Baulier et al. | 379/189 |
| 6,163,604 A * | 12/2000 | Baulier et al. | 379/189 |
| 6,178,230 B1 | 1/2001 | Borland | 379/67.1 |
| 6,195,419 B1 | 2/2001 | Gilboy | 379/114.26 |
| 6,254,000 B1 * | 7/2001 | Degen et al. | 235/380 |
| 6,282,274 B1 | 8/2001 | Jain et al. | 379/114.26 |
| 6,324,269 B1 | 11/2001 | Malik | 379/114.23 |
| 6,327,346 B1 | 12/2001 | Infosino | 379/88.02 |
| 6,381,317 B1 | 4/2002 | Bala et al. | 379/114.23 |
| 6,496,936 B1 * | 12/2002 | French et al. | 726/7 |
| 6,546,238 B1 | 4/2003 | Nightingale et al. | 455/406 |
| 6,603,843 B1 | 8/2003 | Hagemann | 379/111 |
| 6,639,977 B1 | 10/2003 | Swope et al. | 379/11.21 |
| 6,658,393 B1 * | 12/2003 | Basch et al. | 705/38 |
| 6,826,173 B1 | 11/2004 | Kung et al. | |
| 6,857,073 B1 * | 2/2005 | French et al. | 713/168 |
| 2003/0108158 A1 | 6/2003 | Brown et al. | 379/88.01 |
| 2003/0108159 A1 | 6/2003 | Brown et al. | 379/88.01 |
| 2003/0108160 A1 | 6/2003 | Brown et al. | 379/88.01 |
| 2003/0108161 A1 | 6/2003 | Brown et al. | 379/88.01 |
| 2003/0108163 A1 | 6/2003 | Brown et al. | 379/88.01 |
| 2003/0112927 A1 | 6/2003 | Brown et al. | 379/67.1 |
| 2003/0112928 A1 | 6/2003 | Brown et al. | 379/88.22 |
| 2003/0112944 A1 | 6/2003 | Brown et al. | 379/201.01 |
| 2003/0112951 A1 | 6/2003 | Brown et al. | 379/210.02 |
| 2003/0112956 A1 | 6/2003 | Brown et al. | 379/211.01 |

FOREIGN PATENT DOCUMENTS

| | | |
|---|---|---|
| EP | 0676882 A2 | 10/1995 |
| JP | 8139797 A | 5/1996 |
| JP | 10294784 A | 11/1998 |

OTHER PUBLICATIONS

WPAT Derwent 1995-346415.
WPAT Derwent 1996-315499.
WPAT Derwent 1999-031530.

* cited by examiner

PROVIDING ACCOUNT USAGE FRAUD PROTECTION

CROSS-REFERENCE TO RELATED APPLICATIONS

The present application is related to the following co-pending applications:
(1) U.S. patent application Ser. No. 10/015,381;
(2) U.S. patent application Ser. No. 10/015,281;
(3) U.S. patent application Ser. No. 10/015,265;
(4) U.S. patent application Ser. No. 10/015,267;
(5) U.S. patent application Ser. No. 10/015,282;
(6) U.S. patent application Ser. No. 10/015,280;
(7) U.S. patent application Ser. No. 10/022,160;
(8) U.S. patent application Ser. No. 10/022,158;
(9) U.S. patent application Ser. No. 10/022,161, abandoned Sep. 27, 2004;
(10) U.S. patent application Ser. No. 10/022,624;
(11) U.S. patent application Ser. No. 10/022,164; and
(12) U.S. patent application Ser. No. 10/022,163; issued Jan. 27, 2004 as U.S. Pat. No. 6,683,941.

BACKGROUND OF THE INVENTION

1. Technical Field

The present invention relates in general to telecommunications and, in particular, to voice identification. Still more particularly, the present invention relates to providing account usage fraud protection.

2. Description of the Related Art

Credit card systems often track the locations of where credit cards are utilized, such that if a credit card number is utilized more than often, or at locations geographically incoherent, the card owner is contacted to insure that the charges are valid. Store fronts typically require a customer to produce an actual credit card, however, when ordering products via the telephone or through Internet shopping, a person may be sitting in Austin, Tex. and make purchases within a single hour across the globe with just a credit card number and expiration date. Stealing a physical credit card today is not as advantageous as just stealing the credit card account information.

To add protection against fraud, some credit card companies require customers to call and verify a purchase before the charge to a credit card account is allowed. For example, a credit card company may require customers to call and verify charges for purchases made via the Internet. However, a call verification only requires the caller to provide an account number and password, such as the card holder's mother's maiden name. With the amount of personal information easily accessible via the Internet, the information needed to verify an account charge may easily be obtained by someone committing fraud.

While credit card accounts are easy to commit fraud with because only a card number and expiration date are needed, other types of accounts may also be accessed by unauthorized persons. For example, an individual may establish a stock account accessible via the Internet with a user name and password. The server providing the stock account does not typically provide any fraud protection other than not releasing a "forgotten password" unless certain personal information is provided.

Therefore, in view of the foregoing, it would be advantageous to provide a method, system, and program for reducing the risk of fraud for account usage. In particular, it would be advantageous to provide a method, system, and program for tracking the location, devices utilized, and other context information about an individual so that suspicious charges may be determined and sent to the individual for authentication.

SUMMARY OF THE INVENTION

In view of the foregoing, it is therefore an object of the present invention to provide an improved telecommunications system.

It is another object of the present invention to provide a method, system and program for improved voice identification.

It is yet another object of the present invention to provide a method, system and program for providing account usage fraud protection.

According to one aspect of the present invention, a context for a use of an identification via a communication line is detected at a fraud protection service. The context for use of the identification is analyzed in view of multiple previous uses of the identification. A level of suspicion of fraudulent use of the identification is specified according to the analysis of the context. Depending on the level of suspicion, further use of the identification may require additional authentication or may be barred. The identification may include a user name, an account number, a password, or other identifier that may be utilized to represent an individual in accessing products and services.

A trusted telephone network preferably facilitates the communication line and initiates a context inference service to identify the context of a call. The context inference service may be initiated locally within the trusted telephone network or at a server located outside the trusted telephone network, with additional security applied for the communication channel.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
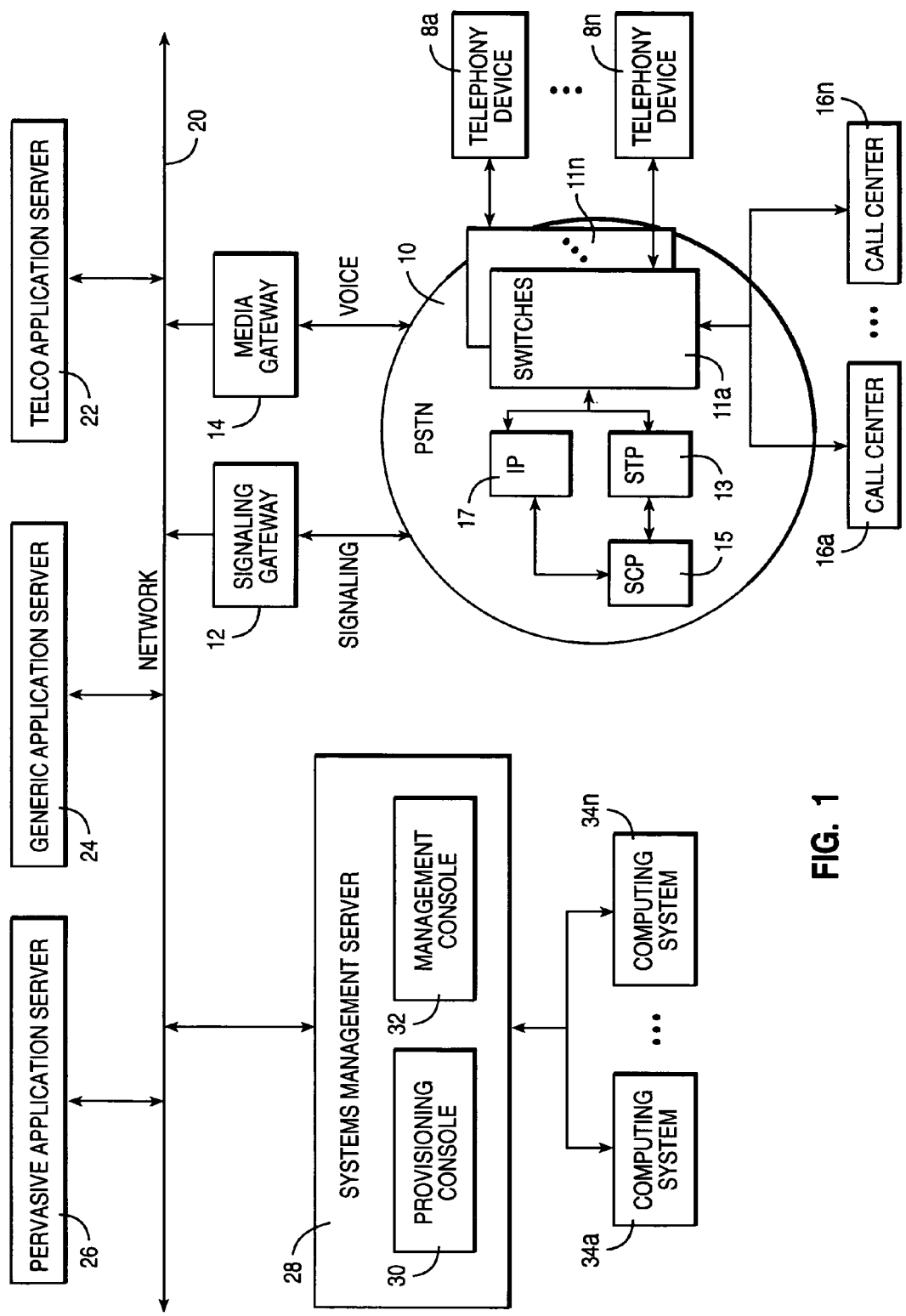
FIG. 1 depicts a block diagram of a network environment in which the present invention may be implemented.

A method, system, and program for providing account usage fraud reduction are provided. Preferably, a user signs into whatever system is accessing user account information via a communication channel according to a voice authentication, signature authentication, credit card account number, password, or a biometric input authentication. A single VID is preferably authenticated to represent the user that includes a user name, identification number, account providers and numbers, line number subscriptions and other information.

A context inference system preferably determines a context for each use of a VID. The context may include identities of parties to a use, devices utilized, locations associated with the devices, scheduled events of the parties, billing plans for the parties, and other context information for a use of a VID. In particular, context where use of a VID includes an account transaction may include, but is not limited to, an identity of the user providing account information, an identity of the person or entity receiving the account information, the identity of the device from which the account information is produced, the identity of the device requesting payment from an account, the locations of these devices, the path of an account transaction from telephony enabled devices and switching systems, billing information for the user, and other information that describes the context of an account transaction. The locations of a device may include, but are not limited to, the time zone, country, state, city, building location, or GPS location.

Usage of a VID, and in particular an account transaction, may be initiated from an in-store purchase, a telephone purchase, or an Internet purchase, for example. An account service preferably tracks account transactions according to the single VID authenticated for the user across the multiple purchase venues. Then, context clues, such as the location of the user for each purchase, the devices utilized for each purchase, the shipping address provided for purchases, and other context information may be utilized to check for suspicious charges.

The context for each account transaction is preferably determined by a context inference engine located within an Intelligent Peripheral of the trusted telephone network and/or located within a Telco Application service outside the trusted telephone network. As will be further described, the Telco application service located outside the trusted telephone network is enabled to provide services to callers and callees via enhanced security channels.

Suspicious charges for an account are preferably determined by a fraud protection service located within an Intelligent Peripheral of the trusted telephone network and/or located within a Telco Application service outside the trusted telephone network. The fraud protection service analyzes the context of account transactions to determine suspicious charges. Then, the fraud protection service may distribute the suspicious charge to the account holder and/or may require the account holder to provide a voice sample for voice authentication of the identity of the account holder in addition to other biometric or non-transferrable inputs.

In particular, it is important that context for uses of a VID other than for account transactions are determined in order to build a full truth profile for an individual from which fraudulent uses of an individual's VID may be compared. For example, the context of each call placed by the individual may be tracked according to VID. In addition, the context of each Internet access by the individual may be tracked according to VID.

For purposes of the present invention, the caller is preferably the account holder and the callee is preferably the product or service distributor. In addition, for purposes of the present invention, where an in-store purchase is made, the credit card machine preferably calls a credit card account service, however, the VID is still that of the account holder verified by a signature or other input and the RVID transmitted is that of the credit card machine. An additional RVID may be returned to the credit card machine identifying the account provider and an order number. Where an Internet purchase is made, terminal from which an individual places the order provides the caller identity, while the web site server receiving the order is the callee. In alternate embodiments of the present invention, other types of devices may be utilized to provide account transactions where the caller and callee are identified.

For purposes of the present invention, telephony devices are termed origin devices when utilized for origination of a call to an intermediary device and are termed destination devices when utilized for receipt of a call from an intermediary device. Subscribers to a call are termed callers when originating a call and are termed callees when receiving a call. Callers and callees may or may not be line subscribers to the particular telephony device utilized.

In the following description, for the purposes of explanation, numerous specific details are set forth to provide a thorough understanding of the present invention. It will be apparent, however, to one skilled in the art that the present invention may be practiced without these specific details. In other instances, well-known structures and devices are shown in block diagram form to avoid unnecessarily obscuring the present invention.

With reference now to the figures, and, in particular, with reference now to FIG. 1, there is depicted a block diagram of a network environment in which the present invention may be implemented. While the present invention is described with reference to one type of network environment, it will be understood by one with skill in the art that the present invention may be implemented in alternate types of network environments.

First, the network environment incorporates a Public Switching Telephone Network (PSTN) 10. As is known in the art the core of PSTN 10 may include multiple telephone networks, each owned by one of multiple independent service providers. Each telephone line is carried by an independent service provider within PSTN 10 and is typically assigned to at least one subscriber.

Switching of a call within an independent service provider's telephone network is considered trusted movement within a trusted network because the call remains within the company's telephone network infrastructure. However, calls may be transferred from one service provider's telephone network to another service provider's telephone network in generally trusted movement. Generally, service providers are in competition with one another and therefore there is general trust in transferring a call, but not trust in sharing of subscriber information beyond a subscriber number and name from one service provider to the next without security features or other arrangements.

Advantageously, each telephone network within PSTN 10 may access a data network functioning as an extension to PSTN 10 via an Intranet. Data networks may include, for example, subscriber profiles, billing information, and preferences that are utilized by a service provider to specialize services. Transfer of information between a service provider's data network and telephone network is trusted movement in sharing of information.

Further, each telephone network within PSTN 10 may access server systems external to PSTN 10 in the Internet Protocol over the Internet or an Intranet. Such external server systems may include an enterprise server, an Internet service provider (ISP), an access service provider (ASP), a personal computer, and other computing systems that are accessible via a network. In the present embodiment, transfer of information between PSTN 10 and server systems accessible via a network 20 is untrusted and therefore may require verification and additional security. Network 20 may be preferably considered an external network.

In the present invention, network 20 may comprise a private network, an Intranet, or a public Internet Protocol network. Specifically, telco application server 22, generic application server 24, pervasive application server 26, and systems management server 28 represent server systems external to PSTN 10 that may be accessed by PSTN 10 over network 20.

In particular, telco application server 22 preferably includes multiple telco specific service applications for providing services to calls transferred to a server external to PSTN 10. In particular, a call may be transferred from PSTN 10 to telco application server 22 to receive at least one service and then the call is transferred back to PSTN 10. PSTN 10 preferably brokers the connection between the telephony device and telco application server 22. Such services may also be provided to calls within PSTN 10, however placing such services at a third party such as telco application server 22, is advantageous because adding services and information to PSTN 10 is time consuming and costly when compared with the time and cost of adding the services through telco application server 22.

In accord with an advantage of the present invention, as will be further described, the identity of both the caller and the callee may be authenticated by one of telephony devices 8a–8n, PSTN 10, or by telco application server 22. By authenticating the actual identity of the person making a phone call and the person receiving the phone call, rather than the identification of a device from which a call is made and received, an enhanced specialization of services to subscribers may be performed.

An authentication service within telco application server 22 may include identification and verification of the identity of a caller and/or callee of a particular call. Such a service may require that subscribers provide voice samples when setting up a subscription. The stored voice samples may then be compared against voice samples received for a particular call in order to authenticate the identity of a current caller or callee of the particular call.

Generic application server 24 preferably accesses independent server systems that provide services. For example, a messaging server, a financial server, a credit card account server, an Internal Revenue Service (IRS) server, and database management system (DBMS) server may be accessed in HTTP via network 20. Each of these servers may include a telco service application that requires authentication of the subscriber before access is granted. For example, a financial server may provide a telco service application that allows an authenticated subscriber to access current financial records and request stock quotes from the financial server. In another example, a credit card account server may provide credit card account services in response to account transaction requests.

Pervasive application server 26 manages services for wirelessly networked devices. In particular, pervasive application server 26 preferably handles distribution of wireless packets of voice and data to wirelessly networked devices utilizing a standard such as short messaging service (SMS) messaging or other 3G standards.

Systems management server 28 manages subscriber personalization via the web. In particular, systems management server 28 includes browser technology that includes a provisioning console 30 for establishing a subscriber profile and a management console 32 for managing and updating the subscriber profile. A subscriber preferably accesses the consoles of systems management server 28 via the Internet utilizing a computing system, such as computing systems 34a–34n.

The subscriber profile may be accessed at systems management server 28 by other external servers and PSTN 10 via network 20. In addition, a local copy of a subscriber profile updated in systems management server 28 may be stored within a particular service provider's data network or telephone network. Each service provider may specify the types of preferences and other information included within a subscriber profile.

In particular, a subscriber may provide a voice imprint when establishing a subscriber profile through provisioning console 30. Other types of authentication information may also be provided including, but not limited to, a signature, a password, an eye scan, a smart card ID, and other security devices. In addition, a subscriber may designate billing preferences, shopping preferences, buddy list preferences, access numbers and devices, and other preferences that enable specialized service to the subscriber when the subscriber's identity is authenticated from the voice imprint or other identification.

Advantageously, a management agent is built into each external server to monitor the services provided by each server according to the authenticated subscriber receiving the services. By monitoring service output according to subscriber, the subscriber may then be billed according to each use of a service.

PSTN 10 preferably includes both voice and data signaling networks that interface with network 20 via gateways. Each of the gateways acts as a switch between PSTN 10 and network 20 that may compress a signal, convert the signal into Internet Protocol (other protocol) packets, and route the packets through network 20 to the appropriate server.

In particular, the voice network interfaces with network 20 through media gateway 14 which supports multiple protocol gateways including, but not limited to, SIP. SIP is a signaling protocol for Internet conferencing, telephony, presence, events notification and instant messaging.

In addition, in particular, the data signaling network interfaces with network 20 through signaling gateway 12 which supports multiple protocol gateways including, but not limited to, parlay protocol gateways and SS7 protocol gateways. Internet servers, such as telco application server 22 may include protocol agents that are enabled to interact with multiple protocols encapsulated in Internet Protocol packets including, but not limited to, SS7 protocol, parlay protocol, and SIP.

Looking into PSTN 10, a telephone network typically includes multiple switches, such as central office switches 11a–11n, that originate, terminate, or tandem calls. Central office switches 11a–11n utilize voice trunks for transferring voice communications and signaling links for transferring signals between signaling points.

Between signaling points, one central office switch sends signaling messages to other central office switches via signaling links to setup, manage, and release voice circuits required to complete a call. In addition, between signaling points, central office switches 11a–11n query service control points (SCPs) 15 to determine how to route a call. SCPs 15 send a response to the originating central office switch containing the routing number(s) associated with the dialed number.

SCPs 15 may be general purpose computers storing databases of call processing information. While in the present embodiment SCPs 15 are depicted locally within PSTN 10, in alternate embodiments SCPs 15 may be part of an extended network accessible to PSTN 10 via a network.

One of the functions performed by SCPs 15 is processing calls to and from various subscribers. For example, an SCP may store a record of the services purchased by a subscriber, such as a privacy service. When a call is made to the subscriber, the SCP provides record of the privacy service to initiate an announcement to a caller to identify themself to the subscriber with the privacy service who is being called. According to an advantage of the invention, authentication of the subscriber receiving the call may be required before the privacy service is initiated for that subscriber.

In particular, network traffic between signaling points may be routed via a packet switch called an service transfer point (STP) 13. STP 13 routes each incoming message to an outgoing signaling link based on routing information. Further, in particular, the signaling network may utilize an SS7 network implementing SS7 protocol.

Central office switches 11a–11n may also send voice and signaling messages to intelligent peripherals (IP) 17 via voice trunks and signaling channels. IP 17 provides enhanced announcements, enhanced digit collection, and enhanced speech recognition capabilities.

According to an advantage of the present invention, the identity of a caller is authenticated according to voice authentication. Voice authentication is preferably performed by first identifying a subscriber by matching the name or other identifier spoken with a subscriber name or identifier. Next, voice authentication requires verifying that the voice audio signal matches that of the identified subscriber. However, in alternate embodiments, the identity of a subscriber may be authenticated according to passwords, signatures, eye scans, encryption, and non-transferrable biometric inputs.

In particular, to perform subscriber authentication of audio signals received from callers, IP 17 may include storage for subscriber specific templates or voice feature information, for use in authenticating subscribers based on speech. If a subscriber specific template is not stored on a local IP 17, then a remote IP containing the subscriber specific template may be accessed via a network. In addition, local IP 17 may access systems management server 28 or another repository for voice imprints to access the subscriber specific template.

Where IP 17 authenticates the identity of a caller (e.g. the subscriber placing a call), a voice identifier (VID) representing the authenticated caller identity is transferred as a signal for identifying the caller. In addition, where IP 17 authenticates the identity of a callee (e.g. the subscriber receiving a call), a reverse VID (RVID) including the callee identity is transferred as a signal for identifying the callee.

Alternatively, to perform subscriber authentication of audio signals received from callers, PSTN 10 may broker a caller identity authentication service from telco application server 22. In particular, a signaling channel is opened between central office switches 11a–11n and telco application server 22 via signaling gateway 12. In addition, a voice channel is opened between central office switches 11a–11n and telco application server 22 via media gateway 14.

Because telco application server 22 is located outside of the trusted network, there may be a time delay associated with establishing a connection to telco application server 22 and authenticating the identity of a caller that is longer than a time delay present where a caller identity is authenticated by IP 17.

In addition, because telco application server 22 is located outside of the trusted network, it is advantageous to establish a level of security for transactions between telco application server 22 and central office switches 11a–11n, wherein the level of security is suitable for untrusted communications. A level of security may be implemented by utilizing security based protocols, such as the secure socket layer, and by applying ordinary encryption. In particular, the level of security preferably protects the communication channel between telco application server and PSTN 10 and authenticates the identity of the server from which a caller identity authentication service is accessed. Therefore an additional feature of signaling gateway 12 and media gateway 14 is security verification.

An origin telephony device or destination telephony device may also determine a VID and/or RVID for the caller and/or callee of a call. In particular, telephony devices 8a–8n and call centers 16a–16n may function as origin and destination telephony devices. Each of the telephony devices may include a database of voice templates that may be matched to authenticate the identity of a caller or callee. In addition, each of the telephony devices may access a third party, such as telco application server 22, to authenticate the identity of the caller or callee. In either case, the telephony device transmits a VID and/or RVID with a call to PSTN 10.

Advantageously, VIDs indicate through text, voice, or video the identity of a caller. For example, a caller's name may be transferred as the identity of a caller. Alternatively, a video clip stored with the subscriber template may be transferred as the identity of a caller. Additionally, VIDs may indicate the identity of the device utilized by a caller to provide context for a call. Further, VIDs may indicate which system or systems have authenticated the caller identity.

After a VID and/or RVID are determined by IP 17, IP 17 and SCP 15 may communicate to designate which services are available according to VID and RVID. Advantageously, by designating services according to a VID and/or RVID, subscribers are provided with services and billed for those services independent of the devices utilized by subscribers. In particular, a 1129 protocol or other protocol may be utilized to enable signal communications between IP 17 and SCPs 15.

Telephony devices 8a–8n may include, but are not limited to wireline devices, wireless devices, pervasive device equipped with telephony features, a network computer, a facsimile, a modem, a credit card scanning device, and other devices enabled for network communication. Advantageously, as previously described, a voice authentication functioning device may be included in each of telephony devices 8a–8n.

In addition, telephony devices 8a–8n may each incorporate a display that provides a visual output of a VID or RVID. Alternatively, such a display may be provided in a separate device connected to the line in parallel to telephones 8a–8n. According to one advantage of the present invention, the identity of the actual caller or actual callee are output to a display in association with a call. In addition, other context information about the caller including, but not limited to, the device from which the call originates or is answered, ratings for a caller or callee, and other context information may be output to a display in association with a call.

Telephony devices 8a–8n are communicatively connected to PSTN 10 via wireline, wireless, ISDN, and other communication links. Preferably, connections to telephony devices 8a–8n provide digital transport for two-way voice grade type telephone communications and a channel transporting signaling data messages in both directions between telephony devices 8a–8n and PSTN 10.

In addition to telephony devices 8a–8n, advanced telephone systems, such as call centers 16a–16n, may be communicatively connected to PSTN 10 via wireline, wireless, ISDN and other communication links. Call centers 16a–16n may include PBX systems, hold queue systems, private network systems, and other systems that are implemented to handle distribution of calls to multiple representatives or agents.

Returning to central office switches 11a–11n, typically, one central office switch exists for each exchange or area served by the NXX digits of an NXX-XXXX (seven digit) telephone number or the three digits following the area code digits (NPA) in a ten-digit telephone number. The service provider owning a central office switch also assigns a telephone number to each line connected to each of central office switches 11a–11n. The assigned telephone number includes the area code (NPA) and exchange code (NXX) for the serving central office and four unique digits (XXXX).

Central office switches 11a–11n utilize office equipment (OE) numbers to identify specific equipment, such as physical links or circuit connections. For example, a subscriber's line might terminate on a pair of terminals on the main distribution frame of one of central office switches 11a–11n. The switch identifies the terminals, and therefore a particular line, by an OE number assigned to that terminal pair. For a variety of reasons, a service provider may assign different telephone numbers to the one line at the same or different times. For example, a local carrier may change the telephone number because a subscriber sells a house and a new subscriber moves in and receives a new number. However, the OE number for the terminals and thus the line itself remains the same.

On a normal call, a central office switch will detect an off-hook condition on a line and provide a dial tone. The switch identifies the line by the OE number. The central office switch retrieves profile information corresponding to the OE number and off-hook line. Then, the central office switch receives the dialed digits from the off-hook line terminal and routes the call. The central office switch may route the call over trunks and possibly through one or more central office switches to the central office switch that serves the called party's station or line. The switch terminating a call to a destination will also utilize profile information relating to the destination, for example to forward the call if appropriate, to apply distinctive ringing, etc.

In the present invention, authentication of the identity of the caller is preferably initiated in IP 17 or telco application server 22. Once a VID for a caller is received at a central office switch, a context inference application is initiated in IP 17 or telco application server 22. The context inference engine preferably requests a caller profile according to VID to determine billing information and personal information about the caller. In addition, the context inference engine preferably determines the identity of the device utilized by accessing a device directory, prompting the caller to indicate the device identity, or other methods. Further, the location of the device may be inferred from information provided by the central office switch originating the call, a GPS location, and the location assigned to a line number. The context information is preferably loaded with the VID at the central office switch.

Context information may be filtered and distributed to the callee. However, for purposes of the present invention, a fraud protection service initiated in IP 17 or telco application server 22 advantageously stores the context information for any account transactions requested during the call.

Authentication of the identity of a callee answering the call is preferably initiated in IP 17 or telco application server 22. Once a RVID for a callee is received at a central office switch, a context inference application is initiated in IP 17 or telco application server 22 to determine the context of the callee side of a call. The callee context information is preferably filtered for distribution to the caller, such that the caller receives a verified identity of the party with which account transactions are performed. In addition, the callee context information is preferably analyzed and stored by the fraud protection service with the account transaction.

As a call is forwarded or transferred to other callers and callees, IP 17 or telco application server 22 are preferably initiated to update the context for a call. For example, the context may indicate the path of line number accessed in a call and whether the call was transferred or forwarded. The fraud protection service may pay particular attention to a forwarded call.

In addition, the fraud protection service may receive the caller VID and callee RVID and search an account ranking database to determine previous account history of each party. For example, a caller VID may have a large number of fraudulent charges associated therewith, such that the fraud protection service may require additional authentication for the account transaction. In another example, a callee RVID for a business entity may indicate that a large number of returns have been associated with the business entity or that the business entity has allowed a large number of fraudulent purchases. The fraud protection service may provide a business rating to the caller or may require additional authentication to be willing to accept charges from the business entity.

Figure 2:
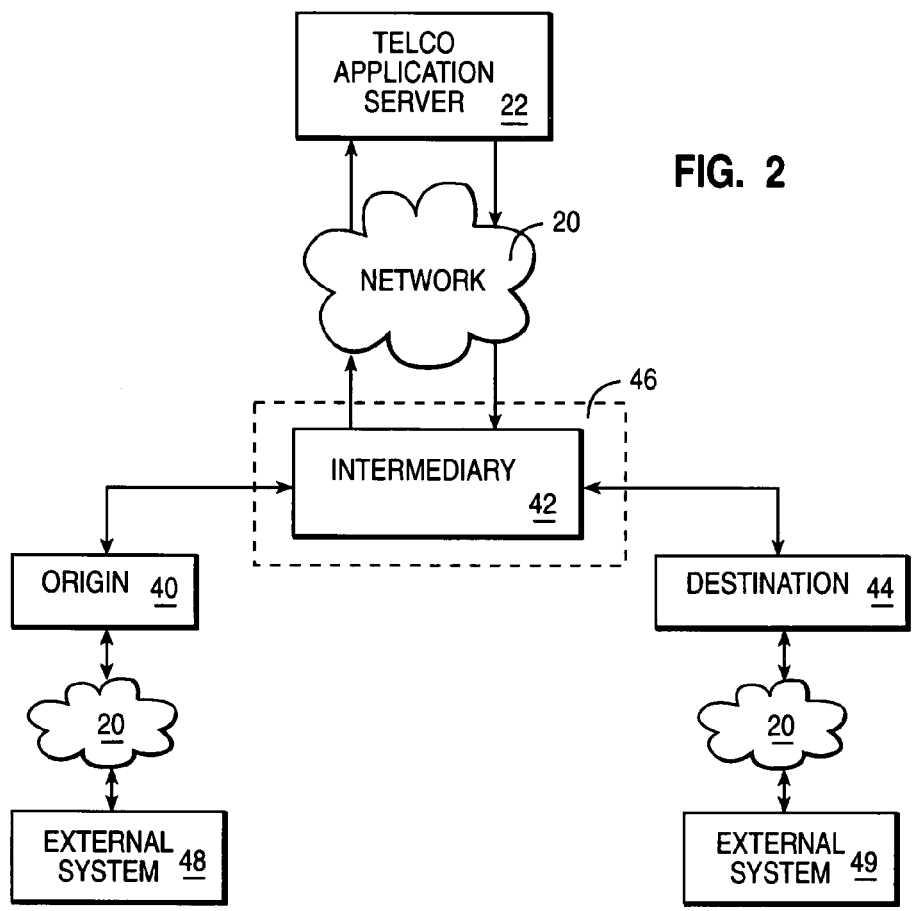
FIG. 2 illustrates a block diagram of an identity authentication and context inference system in accordance with the method, system, and program of the present invention.

Referring now to FIG. 2, there is illustrated a block diagram of an identity authentication and context inference system in accordance with the method, system, and program of the present invention.

Origin device 40 is utilized by a caller to initiate a call. The caller is prompted by the device performing caller authentication to provide a voice utterance. A VID for the caller is provided to intermediary device 42 from the device performing caller authentication. The VID is utilized to access a caller profile that includes service preferences and billing information. In addition, the VID is transmitted with the call to destination device 44 for identifying the caller.

In general, caller identity authentication is performed by receiving a voice utterance from a caller, analyzing the voice utterance for sound qualities and content, and attempting to match the sound qualities and content of a voice utterance to a voice template previously recorded for a caller, to authenticate the identity of the caller. If there is a match between the voice utterance and a voice template, then a VID is determined for the caller and utilized to authenticate the caller identity for retrieving a caller profile and billing the caller. However, in alternate embodiments, the identity of a caller may be authenticated according to passwords, eye scans, encryption, and other biometric methods.

Caller identity authentication may be initiated by origin device 40. In particular, origin device 40 may include voice templates and a feature for performing the caller identity authentication. In addition, origin device 40 may access a third party server 48 via network 20, where third party server 48 may provide access to a database of voice templates and/or perform the caller identity authentication. Origin device 40 then transmits a VID determined for the caller to intermediary device 42 for use in specifying services and billing for a call from origin device 40. Origin device 40 may include a caller telephony device, a credit card machine, a PBX, a call center, a private switching system, network servers, feature servers, and other systems which provide call origination. Third party server 48 may include a telco application server, a generic application server, a database management system server, and other systems that function outside trusted telephone network 46. In particular, intermediary device 42 may facilitate communication between origin device 40 and network 20.

In addition, caller identity authentication may be initiated by intermediary device 42. Intermediary device 42 may include database systems that store voice templates and an IP for performing caller identity authentication. In addition, intermediary device 42 may access telco application server 22 outside of trusted telephone network 46 via network 20, where telco application server 22 provides a caller authentication service and/or provides access to a database of voice templates. Intermediary device 42 may include a PSTN switching network or networks. However, intermediary device 42 may also include a PBX, a call center, or other private switching system. Further, intermediary device 42 may include network servers, Websphere® (Websphere® is a registered trademark of International Business Machines Corporation) servers, and other systems which provide call processing.

Further, caller identity authentication may be initiated by destination device 44. Destination device 44 may include voice templates and a feature for performing the caller identity authentication. In addition, destination device 44 may access a third party server 49 via network 20, where third party server 49 may provide access to a database of voice templates and/or perform the caller identity authentication. Destination device 44 will prompt a caller to provide a voice utterance at origin device 40, where intermediary device 42 facilitates communications between origin device 40 and destination device 44. Destination device 44 then determines and transmits a VID for the caller to intermediary device 42 for use in specifying services and billing for a call from origin device 40. Destination device 44 may include a callee telephony device, a PBX, a call center, a financial account (e.g. credit card account) management server, a private switching system, network servers, feature servers, and other systems which provide call receipt. Third party server 48 may include a telco application server, a generic application server, a database management system server, and other systems that function outside trusted telephone network 46. In particular, intermediary device 42 may also facilitate communication between destination device 44 and network 20.

Similarly, a destination device 44 is utilized by a callee to receive a call. Advantageously, an authenticated identity of the callee may be determined as an RVID. Callee identity authentication may be initiated by origin device 40, intermediary device 42, or destination device 44, in a manner similar to initiation of caller identity authentication, as described above.

In addition to authenticating the identity of a caller or callee in a VID or RVID, the context of the call is preferably determined and transmitted as part of the VID or RVID or separate therefrom. Origin device 40, intermediary device 42, telco application server 22, and/or destination device 44 may include context inference engines that perform context inference services. A context inference engine may utilize context information gathered from multiple databases and may gathered context information directly from a caller or callee in response to prompts.

Context may include, but is not limited to, identities of parties to a call, whether the call includes a party called or answered on behalf of, a subject matter of a call, device identities, device locations, billing information, service subscriptions, orders placed, services accessed, the path of a call, and other information which may provide a caller or callee with context of a call. Information for determining the context of a call may be gathered from a caller or callee profile, from routing information utilized by intermediary 42 from a device directory, from systems management server 28, or other databases of information. The context inference engine may, for example, infer the subject matter of a call as either business or personal based on the identity of the device from which a call originates and the location of that device. Alternatively, the subject of a call as either a business subject or personal subject may be inferred from the billing information context. In another example, the context inference engine may infer the location of a caller or callee based on the registered address of a wireline device utilized by the caller or callee or the GPS location or wireless service tower area of the wireless device utilized by the caller or callee.

Based on the context of a call, a fraud protection service executing within trusted telephone network 46 or telco application server 22 may monitor charges made in association with a particular VID and determine whether any of those charges are suspicious. Suspicion may be raised according to context based criteria, such as detected locations, scheduled locations, shipping addresses, devices utilized, and other information provided in the context of a call. The fraud protection service may contact an account holder based on the VID to determine whether a suspicious charge is authorized. Advantageously, where multiple accounts are associated with a single VID, fraud protections service 55 may monitor VID accesses and uses of multiple accounts.

A VID or RVID may be transferred in multiple protocols, including, but not limited to, Interface Definition Language (IDL). A VID or RVID may include a range of information, where each type of information may be tagged or identified in some other manner. For example, the following tagged context may be received and updated by a fraud protection service:

[transaction date] Nov. 24, 2002
[transaction time] 10:01:20
[caller name] Jon Smith
[caller authentication] voice
[caller device] Jane Doe's cell phone
[caller location] Austin, Tex., GPS location RRR

[call subject] Croaker Project A
[call path] XYZ Call center, forwarded to Mark Attwater, request to credit card account provider CCC
[callee name] Mark Attwater
[callee on behalf of] XYZ Enterprises
[callee location] Atlanta, Ga.
[caller account provider] Credit card account provider CCC
[account transaction] Telephone purchase of 2 parts for $30.50
[identities authenticated by] Jane Doe's cell phone, service provider G In another example, where an in-store purchase is made, the following tagged context may be received and updated by the fraud protection service:
[transaction date] Nov. 24, 2002
[transaction time] 10:10:10
[VID name] Jon Smith
[VID authentication] Signature
[VID location] Austin, Tex.
[call path] Signature verification service, request to credit card account provider CCC
[RVID name] Frog Music Store
[RVID device] Credit card machine
[RVID location] Austin, Tex., store address
[VID account provider] Credit card account provider DDD
[account transaction] In-store Clothing purchase for $100.34
[identities authenticated by] Signature verification service, account provider CCC In analyzing the two tagged VID examples received at the fraud protection service for a single VID of "Jon Smith", one purchase is made via a telephone transaction on a wireless device. The other purchase is made via an in-store purchase transaction. Advantageously, the fraud protection service analyzes the location of "Jon Smith" identified by a GPS location of a cell phone utilized by "Jon Smith" compared with the store address in the second transaction and determines whether there is time for the user to move from one location to another. Other context may also be compared to determine if either charge is suspicious.

In yet another example, where an Internet account is accessed, the following tagged context may be received by a fraud protection service:
[transaction date] Nov. 24, 2002
[transaction time] 10:15:40
[VID name] Jon Smith
[VID authentication] Voice, password
[VID device] wireless web enabled telephone
[VID location] Dallas, Tex.
[call path] Internet service provider A, to web site
[RVID name] www.stocksrus.com
[RVID device] server system
[account transaction] Purchase of IBM stock for $1600.00 for charity Z
[identities authenticated by] Internet service provider A In analyzing this account access in view of the recent account accesses for "Jon Smith" it may be determined that Jon Smith could not log onto the stock service from a cell phone in Dallas, Tex. only minutes after making a purchase in a store in Austin, Tex. Other context, such as the stock being purchased for a charity when the user has never purchased stock for a charity. Another set of context may compare the other amounts spent in other accounts according to VID with the average spending according to VID.

Figure 3:
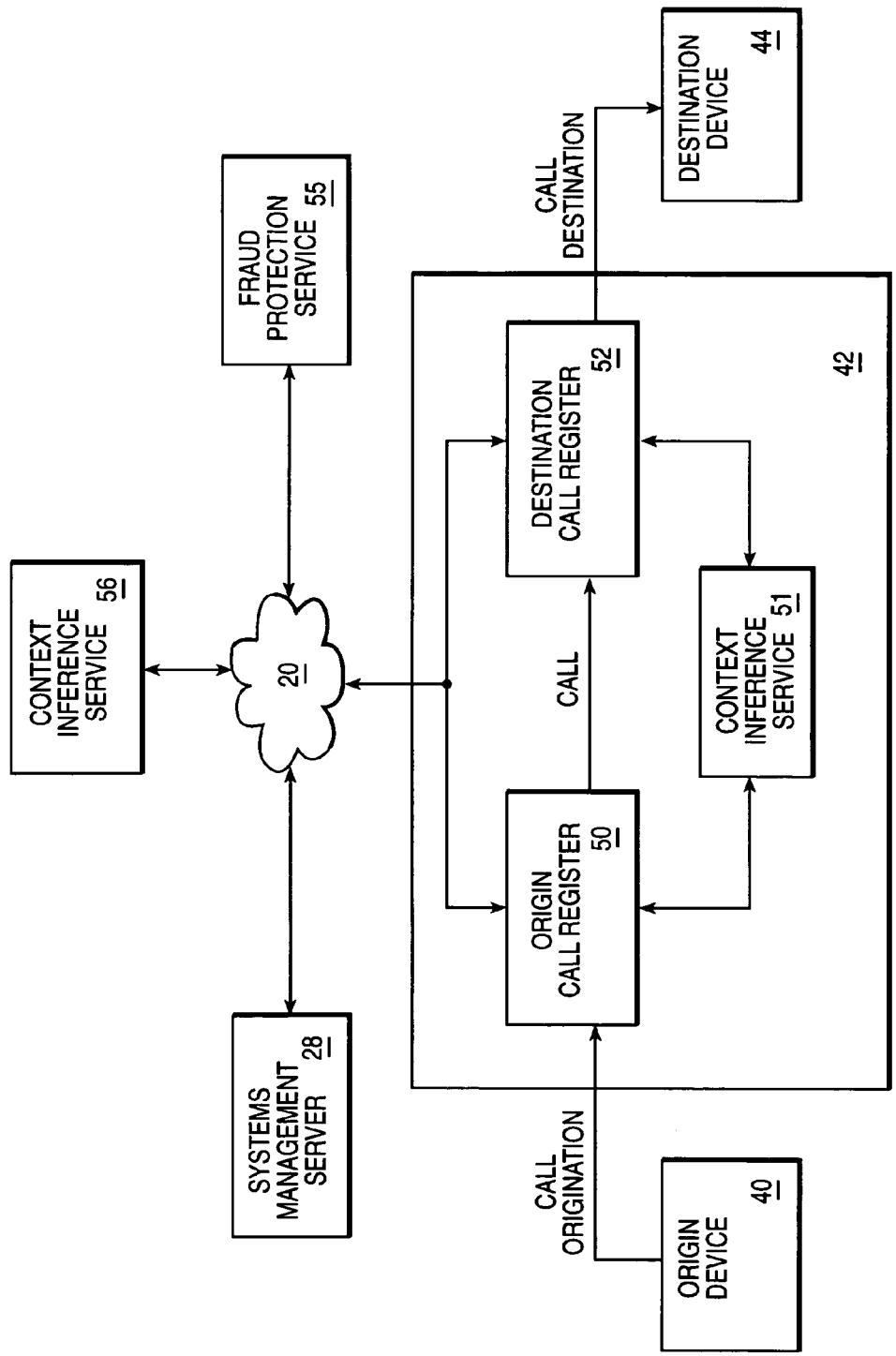
FIG. 3 depicts a block diagram of the flow of a call through a context inference system and fraud protection service in accordance with the method, system, and program of the present invention.

With reference now to FIG. 3, there is depicted a block diagram of the flow of a call through a context inference system and fraud protection system in accordance with the method, system, and program of the present invention. As illustrated, origin device 40 transfers a call request to intermediary device 42. The call request may be an off-hook condition for a wireline device or a network service connection request for a wireless device.

Preferably, a switching service receiving the call request establishes an origin call register 50 and retrieves a line subscriber profile for the origin device line number. The line subscriber profile may be accessed from an SCP or a data storage system external to trusted telephone network 46.

Next, a context inference service may be initiated by the origin switching service. In particular, a context inference service 51 may be located within trusted telephone network 46 as an IP. Alternatively, a context inference service 51 may be located outside trusted telephone network 46 within a telco application server accessible via network 20.

The context inference service preferably determines context for a call including, but not limited to, who is calling, an on behalf of party to the call, the device utilized to place the call, the location of the devices, the billing method for the call, the path of the call, account transactions during the call, services accessed during a call, and/or the subject matter of the call. In addition, other categories of context may be determined.

To determine the context of the device utilized to place a call, the entity subscribing to the line number and/or an identifier for the device are preferably accessed. The first set of context clues is provided to the context inference service by the line subscriber profile. In particular, a line subscriber profile indicates the individual or business that subscribes to a particular line number. Further, a line subscriber profile may indicate that a business subscribes to a telephone service, but provide that service is subscribed to for use by a particular employee or group of employees.

In addition, the line subscriber profile indicates the billing information and services subscribed to by the line subscriber. Billing information may provide context for whether the line number is a business line or personal line. In addition, a billing context for a call may indicate the party responsible for charges incurred in the call.

Further, a line subscriber profile preferably indicates whether the line number is subscribed to for a wireline device, a wireless device, or both. Additional context information may be inferred from whether a wireline or wireless device is utilized.

Preferably the identity of the device may be inferred from the line subscriber profile and other information available. A device identity may include a device name, a line number utilized to access the device, and the device type. The device name may be assigned by the line subscriber and output with a signal from the device. Alternatively, the line subscriber profile may indicate the device name. The device type may indicate the type of line utilized to access the device, including, but not limited to, wireline, wireless, or multiplexed. In addition, the device type may indicate the type of device accessed by the line including, but not limited to, a car telephone line, a computer modem line, a PBX land line, a residential line, a business line, or an Asymmetric Digital Subscriber Line (ADSL) multiplexed line.

Further, determining or inferring the location of a device is advantageous context information. For a wireless device, the location of a device may be determined most precisely where a GPS tracking system is utilized by the origin device 40 or intermediary device 42, to determine the exact geographical location of a caller. For a wireline device, the location of the device is fixed according to the address location of the line number.

In addition, for both a wireline and wireless device, a general location of the originated call may be determined from the geographical area covered by the switching center receiving the call. Wireless devices are preferably provided service by a particular tower or other signal distribution point. The geographical location and area covered by that tower may provide a general location of the origin of a call. As the origin device moves from one wireless coverage area to another, the location may be updated.

The context inference service may infer additional context from location information. For example, the time zone of the caller, the direction of movement of the caller, and other location related information may be inferred from location information.

In addition to extending a dial tone to a caller, an identity of the caller is preferably authenticated and loaded into origin call register 50. A caller profile accessed according to the VID is then accessed and loaded into origin call register 50. The context inference service preferably utilizes the caller profile and VID as additional context clues for the call.

In particular, in retrieving a caller profile according to VID, systems management server 28 may be accessed. Systems management server 28 preferably provides an interface through which an individual may adjust preferences, select services, and provide other information, which is stored and made accessible according to the individual's VID. Systems management server 28 may track services that an individual subscribes to, such as a stock subscription service. In addition, systems management server 28 allows an individual to adjust billing information and view current charges according to VID.

The VID provides the context of who is placing the call, or initiating the account transaction. The caller profile provides further context based on the billing information and service subscriptions of the caller.

In addition, a caller profile may include preferences for filtering context information depending on multiple factors. Such factors may include, but are not limited to, the callee, the device placing the call, the device receiving the call, the time of day, a caller's schedule, and other variables selected by the caller.

The subject matter of a call may be determined by prompting a caller to provide a voice or text entry indicating the subject matter of the call. Alternatively, the context inference engine may infer the subject matter of a call based on the caller's schedule. The context inference engine may also infer the subject matter of a call based on the caller's business or the business associated with the line number utilized by the caller.

The call is preferably transferred through a voice channel to a destination switch, in which a destination call register 52 is created to hold the call. In addition, context for the call may be transferred through a signaling channel to the destination switch and loaded into destination call register 52.

Advantageously, the destination switch controls termination of the call at destination device 44. The context information for the call is also transferred to destination device 44, such that the callee is provided with a context for the call. The context information available in destination call register 52 may be filtered prior to transmittal to destination device 44 according to filtering preferences associated with the device, a line subscriber, or the callee. In addition, destination device 44 may filter the context displayed to a callee according to the device capabilities and preferences selected for the device.

In particular, the destination switch preference initiates at least one of context inference service 51 and context inference service 56 to determine the context of the recipient side of a call. Determining the context of the recipient side of a call may be performed in a manner similar to that described with reference to determining the context of the caller side of a call. In addition, as will be further described, context inferences may be further enhanced when caller side and recipient side context information is combined.

In particular, the line subscriber profile associated with destination device 44 may be accessed and utilized by the context inference service to determine context for the call. In addition, destination device 44 may return a device identifier to destination call register 52 or the identity of destination device 44 may be inferred from other context information. Further, the identity of the callee is preferably authenticated, such that the RVID and callee profile accessible according to RVID further enhance context information.

Context information determined for the recipient side of the call may be transferred to origin device 40 via origin call register 50. Filtering of the recipient said call context may be performed according to multiple factors, including callee filtering preferences. In particular, multiple entities may receive the filtered context information, where filtering preferences may be uniquely specified for each of the multiple entities.

In addition, context may indicate the path of a call. Each line number accessed during a call is preferably captured by a switch, such as the origin switch or destination switch. In addition, where origin device 40 or destination device 44 are call centers or private switching networks, the path of the call through the call centers or private switching networks may be captured. Moreover, as a call is forwarded from one callee to another, the path of the call preferably includes the identity and other information of each callee.

For purposes of the present invention, context may also include an order for a product or service made be a caller that initiates an account transaction. In addition, where a caller logs into a service, such as an Internet based service, whether or not an account transaction is initiated, the context is updated to include the service accessed.

A fraud protection service 55 preferably receives records of account transactions and services accessed according to VID. In addition, fraud protection service 55 may receive records of other activity according to VID in order to receive location and other context for a caller. In the present example, fraud protection service 55 is depicted as accessible via network 20 outside trusted telephone network 46, however in alternate embodiments, fraud protection service 55 may be accessible within trusted telephone network 46.

Advantageously, fraud protection service 55 monitors account activity according to VID to determine whether a VID name or other identifier is being utilized by someone other than the VID owner. By monitoring all accesses according to a single identifier, fraud protection service 55 may monitor telephone, in-store, and Internet uses of a VID name, VID account information, and other VID tagged information.

By comparing the locations of a caller according to VID context over a period of time, suspicious account transactions and service accesses may be determined. In particular, by comparing the scheduled event of a caller with the caller location during an account transaction or service access, suspicious entries may be determined. For example, if a caller has a scheduled trip to Mexico and a call is detected with the VID from Mexico, but then a purchase according to the VID account is made originating in Colorado, the entry from Colorado may be marked as suspicious.

Fraud protection service 55 may designate a scale of suspiciousness for entries received according to VID. In addition, fraud protection service 55 may maintain a fraud database according to VID and RVID that indicates previous fraudulent activity that may raise flags of suspiciousness for current activity.

An account provider, a caller, and/or a callee may set preferences for receiving suspicious entry alerts from fraud protection service 55 according to the context of the entries. For example, an account provider may want to receive all suspicious entry alerts, while a caller may only want to receive suspicious entry alerts for usage of certain accounts.

Each of an account provider, caller and/or callee preferably designates preferred contact mediums in profiles accessible according to VID and RVID. The preferred contact mediums may include line numbers, text messaging identifiers, and electronic mail (e-mail) identifiers, for example.

Fraud protections service 55 then filters the context of a suspicious entry for output according to the communication medium. According to another advantage of fraud protections service 55, a caller or callee may be required to provide an authentication in response to the suspicious entry output in order for a credit card account provider to process an account transaction or for a web page to allow access to a registered service. In particular an account provider may designate criteria requiring authorization before a transaction will occur once a suspicious entry is detected by fraud protection service 55.

Figure 4:
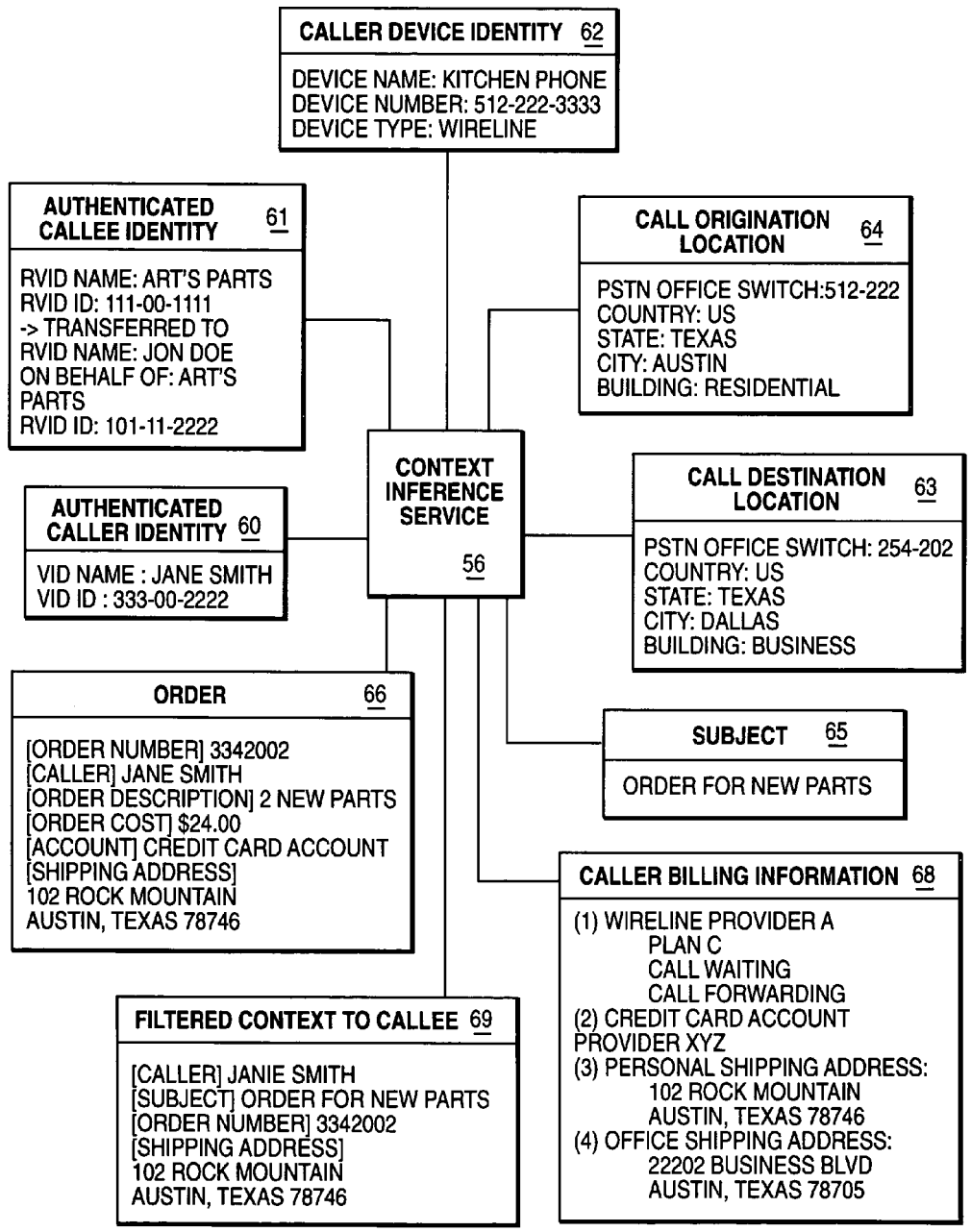
FIG. 4 illustrates an illustrative example of context information for a call in association with the method, system, and program of the present invention.

Referring now to FIG. 4, there is depicted an illustrative example of context information for a call in association with the method, system, and program of the present invention. As illustrated, multiple types of context information may be accessed and determined by context inference service 56. In addition to the examples depicted, in alternate embodiments, other types of context information may be accessed and determined.

In the example, a call is placed by "Jane Smith" to "Art's Parts". As illustrated by the authenticated callee identity 61, the call is initially received by a call center for "Art's Parts" and then transferred to a representative "Jon Doe" answering calls on behalf of "Art's Parts".

An authenticated caller identity 60 includes a VID name and a VID ID. The VID name and VID ID are preferably retrieved in response to a voice authentication by "Jane Smith". In particular, additional encrypted information, such as a digital signature may be included with an authenticated caller identity. Further, an authenticated identity may also indicate, for example, the device utilized to perform the authentication, the frequency of identity of authentication, and the number to tries to achieve identity authentication.

A caller device identity 62 indicates the name, line number, and type associated with a device utilized by the caller to place the call. An origin device may provide device identification or the context inference service may detect and/or infer the device identity. The name of a device may include a specific phone within a business or home or may indicate the line subscriber of the line number. In addition, the name of the device may include a server system or private switching network identifier enabling the origin device. The device type may include whether a wireline or wireless number is accessed and may further indicate the hardware accessed.

A call origination location 64 indicates a location at which the call originated, while the call destination location 63 indicates a location at which the call was answered. The location of the caller and the callee may be inferred from a device location. A GPS location of an origin device may be transmitted with the call or detected by an intermediary device. In addition, the context inference service may determine a general location of an origin device based on the geographical area serviced by a PSTN switching network or wireless service provider service area. In the example, the PSTN switching network office switch receiving the call is identified by the numbers serviced by that office switch. The context inference service may then lookup the office switch geographical area, which in the present example includes country, state, and city identifiers. In addition, the context inference service may lookup the location assigned to a wireline number to determine a registered address and the type of building, such as residential or business.

In addition, caller billing information 68 is provided to indicate the billing selections of a caller. Each caller may select multiple service providers and billing options that are accessible according to the caller VID. In the example, a caller has selected a wireline provider A and a credit account provider. Wireline provider A preferably services the current call. Orders placed by the caller are preferably charged to the credit account provider. In addition, a personal shipping address and office shipping address are included in caller billing information 68, such that the caller only needs to select an address, rather than providing the entire address.

A subject context 65 indicates previous subjects of calls by the caller from the device. Context inference service 56 may infer a subject or subjects for a call and prompt the caller to select a subject. In particular, subjects may be inferred from previous subjects of calls between the caller and callee, from a scheduled event, from a type of device utilized, or from other context information. In addition, a caller may enter a subject via voice or text entry. Further, a telephony device utilized by the caller may store frequent subjects, where the caller selects a topic from the telephony device and that subject is transmitted with the call request.

An order 66 is provides context for an account transaction initiated during a call according to the caller VID. In the example, the order includes an order number, a caller, an order description, an order cost, an account provider accessed, and a shipping address selected. In alternate examples, other information may be included in an order. In addition, other activities performed during a call may be recorded, such as services accessed and information viewed.

Context inference service 56 preferably filters the context for output to the caller and callee. For example, filtered context to the callee 69 only includes the caller name, subject of the call, order number and shipping address. However, in alternate embodiments, other context information may be output to the callee. The caller, the callee, the account provider, and other entities may designate filtering preferences that are utilized by context inference server 56 to filter context.

Preferably context filtered for a call is transferred to fraud protection service 55, where fraud protection service 55 filters the context according to context criteria being monitored for a VID. While in the present embodiment context inference service 56 and fraud protection service 55 are depicted as separate services, in alternate embodiments of the present invention the services function as a single service.

Figure 5A:
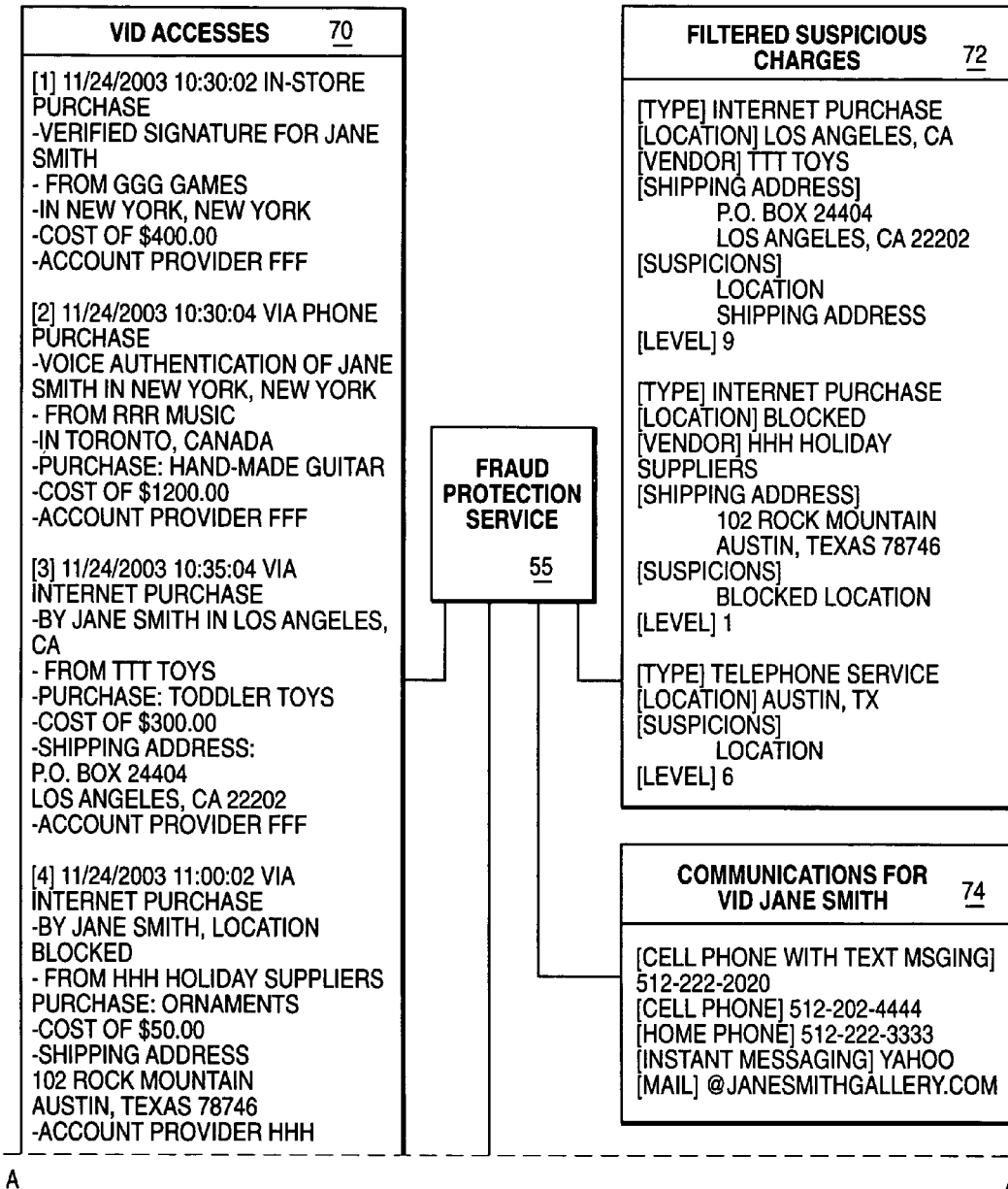
FIG. 5 depicts an illustrative embodiment of context monitored by a fraud protection service in accordance with the method, system, and program of the present invention.
Figure 5B:
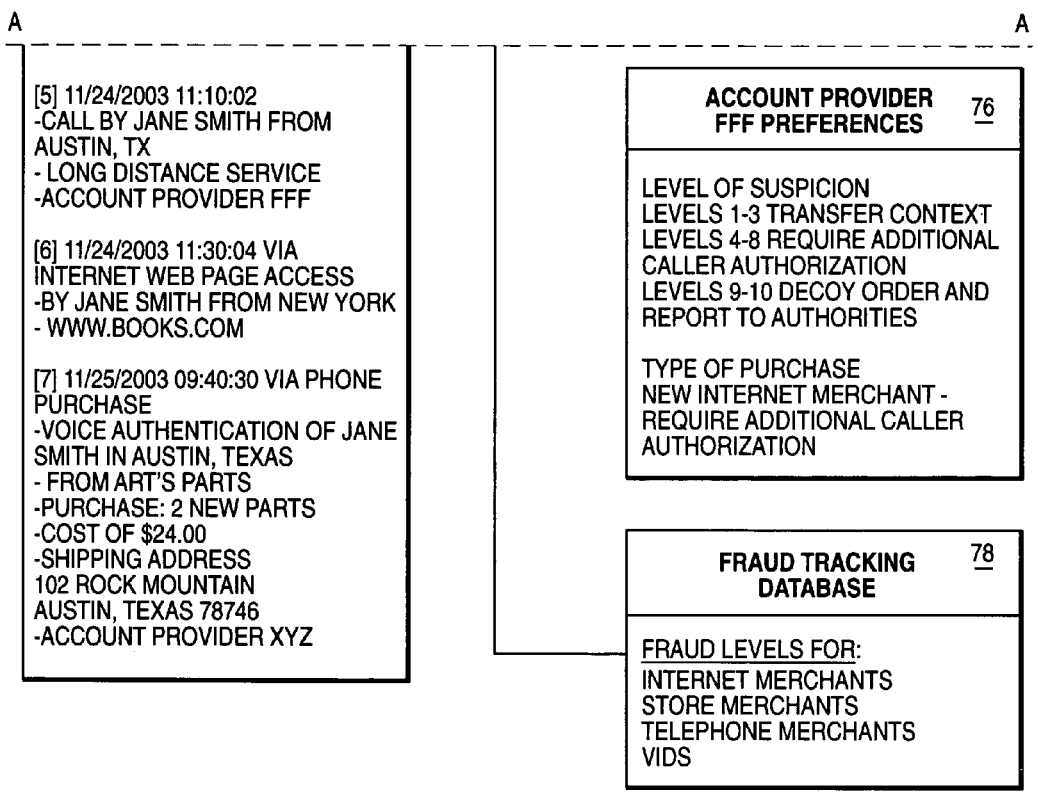

Referring now to FIG. 5, there is an illustrative embodiment of context monitored by a fraud protection service in accordance with the method, system, and program of the present invention.

As depicted, fraud protection service 55 stores context according to VID in a VID accesses database 70. In the example, VID accesses are stored for Jane Smith, including the call VID access described in FIG. 4. In particular, in-store purchases, phone purchases, internet purchases, phone calls, and internet service accesses are illustrated.

For the in-store purchase, the VID of the in-store customer is accessed by a verified signature. In particular, the user may be prompted to provide a signature that is compared with a signature database to authenticate the identity of the user. Alternatively, where additional verification is not accessible, the credit card account number may identify the VID.

For the phone purchases, the VID of the caller is accessed by voice authentication. Voice authentication and authentication from other biometric inputs may be more advantageous than a password input because biometric inputs are more difficult copy.

For the first two purchases, the VID location is New York. Then, within minutes of the first two purchases, another purchases according to the VID is located in Los Angeles. In particular, the location of the service provider providing Internet access or the location of the network providing Internet access preferably identifies a location. Since the distance between Los Angeles and New York is inaccessible in the time difference between the second purchase and the third purchase, the third entry is determined to be suspicious. In addition, if the location were blocked, the entry would still be suspicious because the shipping address is not one designated for the VID.

Filtered suspicious charges 72 include context information for the third entry to be transferred to the account provider and/or the caller for authorization of the charge. Preferably, fraud protection service 56 monitors account transactions and designates suspicious charges prior to the transfer of funds or access to a service. In particular, a level of suspicion is assigned according to suspicious factors. For example, the third entry has a suspicion level of "9" because the call origination location is not accessible for the VID according to the previous activity and the shipping address is not only not indicated in the VID billing addresses, but is a P.O. Box.

Other entries that are suspicious include the fourth entry because the location is blocked and the fifth entry because the location of the caller is not feasible according to previous entries. In particular, the fifth entry shows use of a long distance service according to the VID, where account provider FFF is charged for the use of the long distance service.

In particular, in the examples, it is assumed that the caller is in New York for the first six entries and in Texas for the last entry because a VID based scheduled is accessed and scheduled locations are compared with actual locations. Scheduled events may include event placed in an electronic schedule.

In addition, preferably, a home city or cities are identified for a VID. Here, Austin is identified as a home city. Then, in addition to scheduled events, flight itineraries, rental purchases, hotel registrations and other travel information may be accessed to verify a location when a VID is detected outside the home city or cities.

Communication preferences for a VID are preferably accessed by fraud protection service 55 when additional authorization is needed for a VID access. In the example, communication preferences 74 include the line numbers of devices registered to the VID or authorized by the VID owner. In addition, an instant messaging service provider and email service provider are identified, where the service providers direct messages identified according to VID.

Account provider FFF preferences 76 preferably indicate preferences designated by the account provider for responding to suspicious entries for an account provided by the account provider. In the example, preferences are categories according to level of suspicion and type of purchase, however other categories may also be specified in alternate embodiments.

In the example, the account provider preferences designate for the context of the entry to be transferred where the level of suspicion is "1–3". Next, where the level of suspicion is "4–8", additional caller authorization is required and the context is transferred to the account provider. Finally, where the level of suspicion is "9–10" a decoy order completion is returned and the account transaction is reported to the authorities and the context is transferred to the account provider.

For the current VID, the internet purchase from TTT Toys is processed by returning a decoy order and notifying authorities because the level of suspicion is "9". However, the internet purchase from HHH Holiday Suppliers is just reported to the account provider at level "1". "Jane Smith" is prompted via one of the preferred communication media to provide additional authentication for the long distance call to continue.

In addition, fraud protection service 55 may maintain a fraud tracking database 78 that indicates fraud levels and occurrences for internet merchants, store merchants, telephone merchants, and VIDs. An account provider may decide not to allow charges from merchants exceeding a particular fraud rating or may require additional authorization from those merchants. In addition, where a VID owner continues to report unauthorized charges, use of the VID may require additional authentication.

Figure 6:
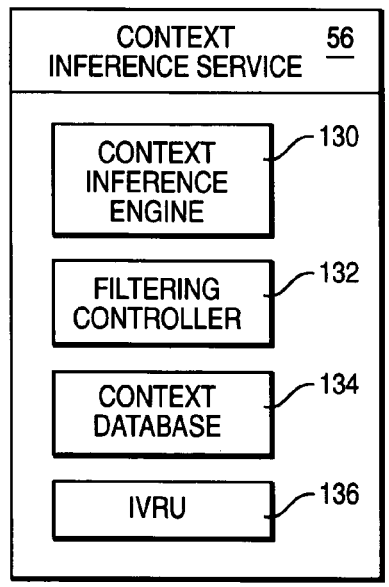
FIG. 6 illustrates a block diagram of a context inference service in accordance with the method, system, and program of the present invention.

With reference now to FIG. 6, there is illustrated a block diagram of a context inference service in accordance with the method, system, and program of the present invention. Context inference service 56 is preferably housed within a computing system including at least a processor, memory, system software, application software, and network software that execute to provide a telco service.

In particular, context inference service 56 includes a context inference engine 130. Context inference engine 130 preferably determines the context for a call through information accessible for the call and through inferences from that information.

In the present invention, determining a context for a call is particularly advantageous where a fraud protection service utilizes the context to determine whether there is fraudulent use of a VID, such as fraudulent use of a VID name or VID account. The fraud protection service may add to the call context, such as indicating a level of suspicion that an entry is a fraudulent use of a VID.

A filtering controller 132 preferably filters context information for each entity receiving that information. Filtering may be performed according to caller, callee, account provider, and other party filtering preferences.

A context database 124 preferably records and stores context for each call processed by context inference service 56. Context database 124 may be later accessed to provide verification and context for billed call transactions. In addition, context database 124 may be accessed by context inference engine 120 to determine current context according to previous context.

An interactive voice recognition unit (IVRU) 126 preferably prompts the caller and callee to provide information required for determining context and detects caller or callee entries. In addition, IVRU 126 may prompt the caller to specify filtering for a particular call.

Figure 7:
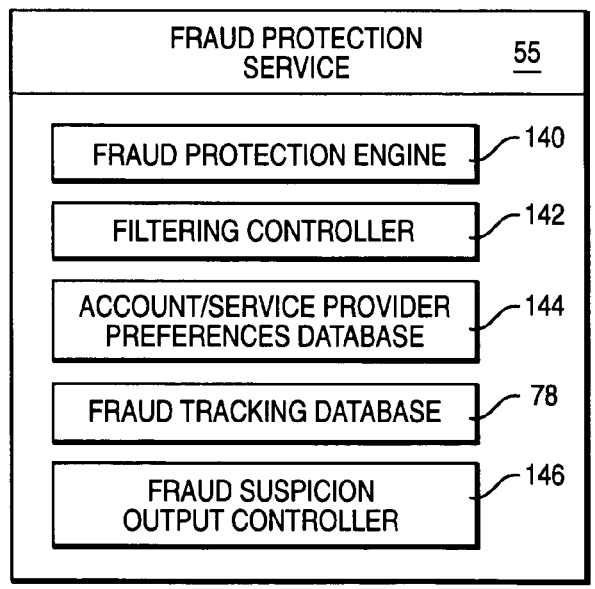
FIG. 7 depicts a block diagram of a fraud protection service in accordance with the method, system, and program of the present invention.

With reference now to FIG. 7, there is depicted a block diagram of a fraud protection service in accordance with the method, system, and program of the present invention. Fraud protection service 55 is preferably housed within a computing system including at least a processor, memory, system software, application software, and network software that execute to provide a telco service.

In particular, a fraud protection engine 140 sorts VID accesses according to VID, analyzes VID accesses, and assigns suspicion levels according to suspicious VID criteria, such as location. A filtering controller 142 preferably filters out suspicious entries for transfer to an account or service provider.

In particular, an account/service provider preferences database 144 indicates preferences of account providers for responding to suspicious entries. The preferences may be specified according to the context of a suspicious entry. Further, an account or service provider may provide preferences for what is considered a suspicious entry.

For example, the account or service provider may request to receive the context for suspicious entries. A fraud suspicion output controller 146 controls output of filtered suspicious entries to the provider. In addition, the account or service provider may request for additional caller authentication to be received. Fraud suspicion output controller 146 may prompt the caller via a preferred communication medium to provide additional authentication. Further, an account or service provider may request for a decoy transaction to be completed and the request investigated.

A fraud tracking database 78 preferably includes fraud ratings according to merchant, VID, and account provider. Fraud ratings are compiled from confirmed fraudulent entries. The fraud ratings may be taken into account and/or published with current suspicious entries.

Figure 8:
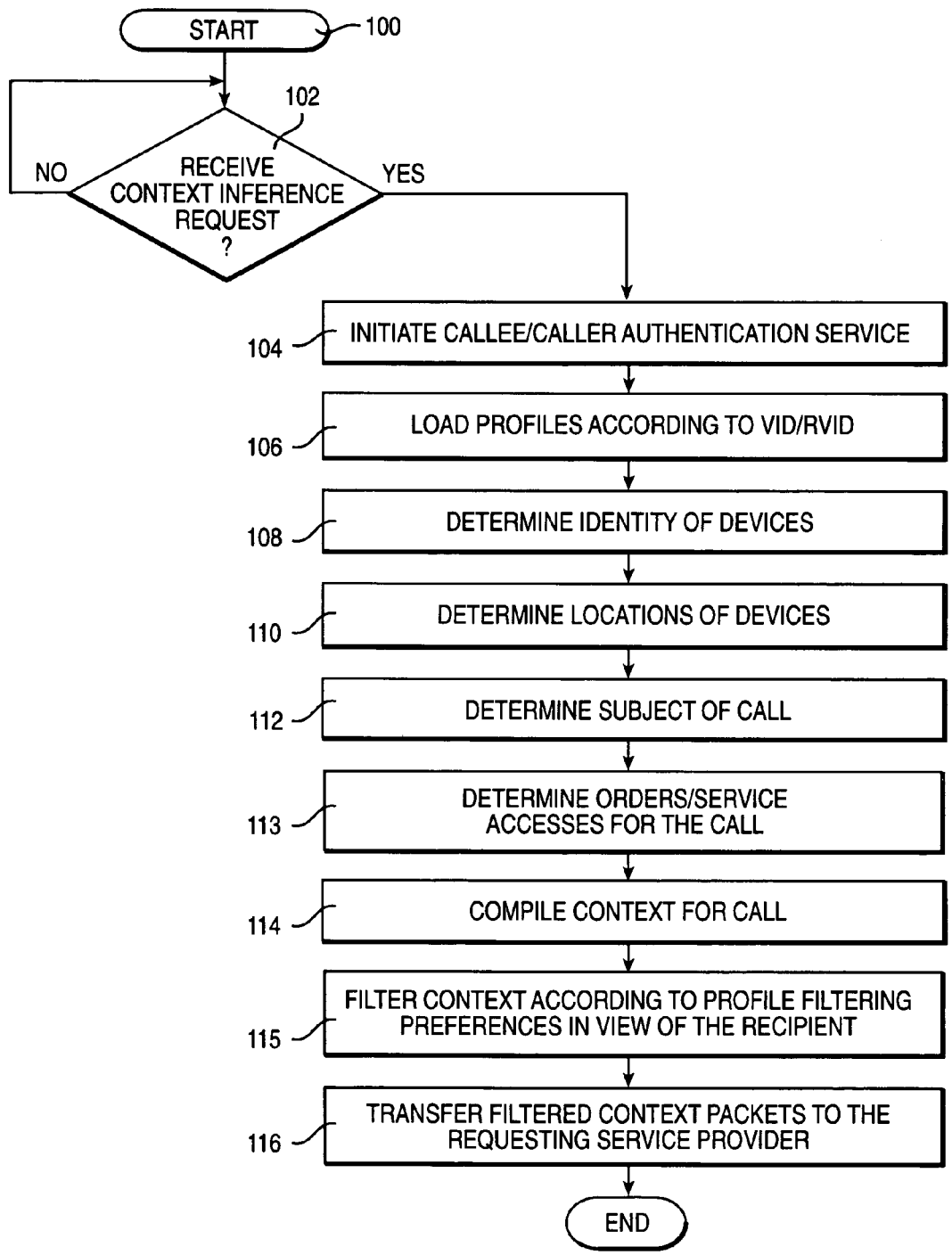
FIG. 8 illustrates a high level logic flowchart of a process and program for determining call context in accordance with the present invention.

With reference now to FIG. 8, there is illustrated a high level logic flowchart of a process and program for determining call context in accordance with the present invention. As depicted, the process starts at block 100 and thereafter proceeds to block 102. Block 102 illustrates a determination as to whether a call context request is received. If a call context request is not received, then the process iterates at block 102. If call context request is received, then the process passes to block 104. A call context request may also include line subscriber profile information and other call information already loaded by the requesting service provider.

Block 104 depicts initiating a caller/callee identity authentication service. Next, block 106 illustrates loading profiles according to the VID/RVID authenticated for the caller/callee. Alternatively, VID/RVID for the call may be transferred with the call context request.

Next, block 108 illustrates determining the identity of any devices utilized in the call. Where a server enables a call from an individual telephone device, the identities of the individual telephone device and the server are preferably determined. Device identity may be determined from the line subscriber identity, a device identity output by the device, the type of service subscribed to for the device, and other available profile information.

Block 110 depicts determining the locations of any devices utilized in the call. Location may be precisely detected from a GPS coordinate. Alternatively, location may be inferred within a general area according to the geographical area covered by an office switch or a wireless tower originating or terminating the call. Further, location may be determined by the physical address assigned to a line number.

Block 112 illustrates determining the subject matter of a call. Subject matter may be inferred, for example, from services subscribed to by the caller/callee, from previous subject matter of calls between the parties, from the location of the calling party, or from the device identities. In addition, a party to a call may be prompted to indicate the subject matter of a call.

Block 113 depicts determining the orders requested and/or service accessed during a call. Orders may include requests for product or services via telephone, merchant web page, or in-store credit card machine. Service accesses may include access to web and telephone accessible services that are authorization protected, such as a long distance telephone service or a stock trading service.

Thereafter, block 114 depicts compiling the context information for a call. In compiling context information, the information utilized to determine context is preferably consolidated into general context categories. In addition, block 115 illustrates filtering the context information for a call according to caller and callee profile preferences. Next, block 116 illustrates transferring the call context to the requesting service provider, and the process ends.

Figure 9:
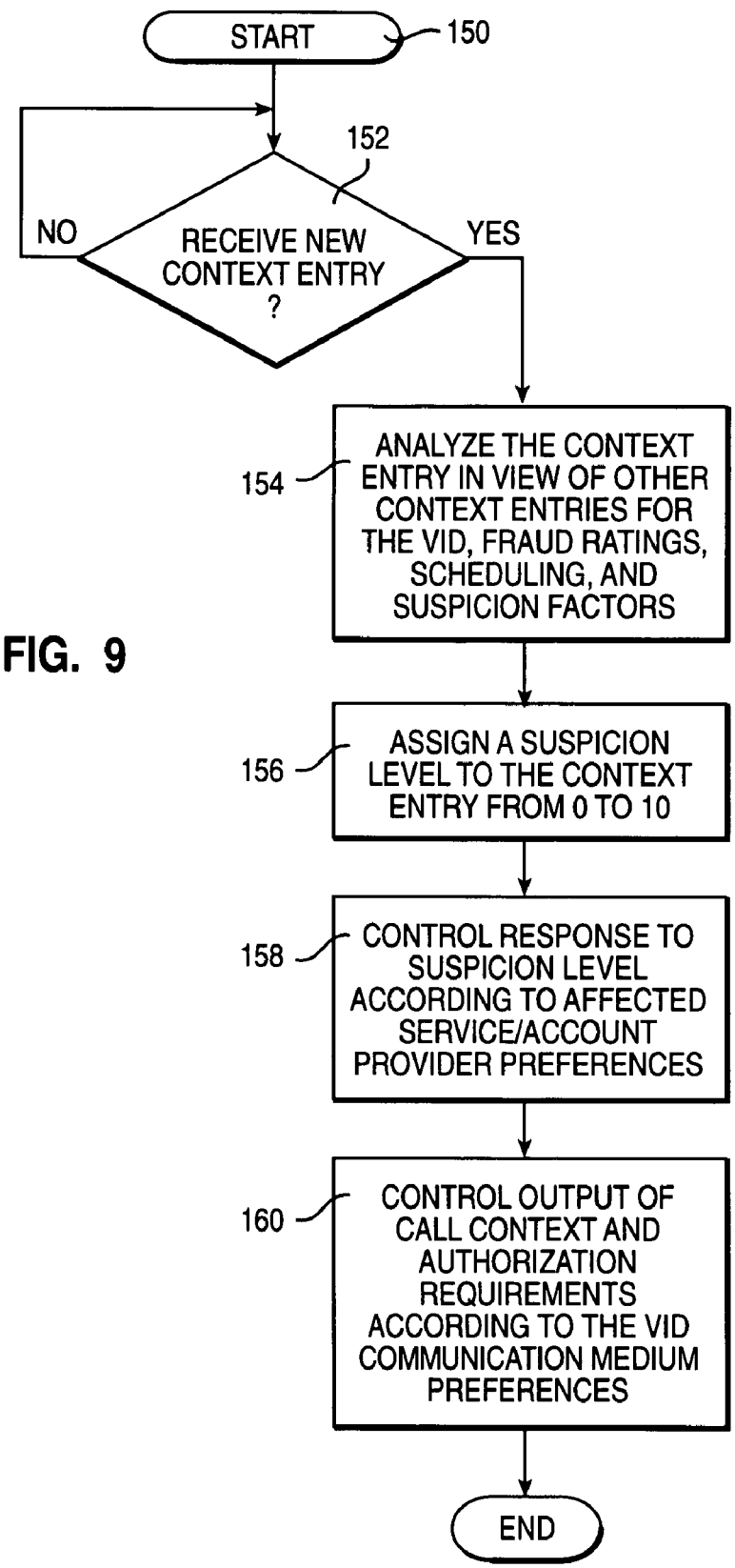
FIG. 9 depicts a high level logic flowchart of a process and program for controlling a fraud protection service in accordance with the method, system, and program of the present invention.

Referring now to FIG. 9, there is illustrated a high level logic flowchart of a process and program for controlling a fraud protection service in accordance with the method, system, and program of the present invention. As depicted, the process starts at block 150 and thereafter proceeds to block 152. Block 152 illustrates a determination as to whether a new context entry is received. When a new context entry is received, then the process passes to block 154.

Block 154 depicts analyzing the context entry in view of other context entries for the VID, fraud ratings, scheduling, and suspicion factors. Scheduling may alternatively be included in the call context, where the context indicates whether the current location of the VID is the same as the scheduled location of the VID.

Next, block 156 illustrates assigning a suspicion level to the context entry from "0" to "10", where "0" indicates no suspicion and "10" indicates a definite fraudulent use. Block 158 depicts controlling a response to the suspicion level according to the affected service/account provider preferences. In addition, the VID may include response preferences, particularly where the VID owner is responsible for charges incurred, even in the event of fraud. In addition, block 160 illustrates controlling output of the call context and authorization requirements according to the VID communication medium preferences, and the process ends.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

While the invention has been particularly shown and described with reference to a preferred embodiment, it will be understood by those skilled in the art that various changes in form and detail may be made therein without departing from the spirit and scope of the invention.

What is claimed is:

1. A method for predicting fraudulent identification usage, comprising:
    responsive to detecting authentication of an identity of a user via a communication line into a same identification used to singly represent said user within a network environment comprising a trusted telephone network and a packet switching network communicatively connected via a secure channel to said trusted telephone network, detecting a context for use of said identification by a context inference service executing within said packet switching network, wherein said context inference service is enabled to detect use of said same identification in association with a plurality of purchases within said network environment comprising at least one of an in-store purchase, an internet purchase, and a telephone purchase and in association with a plurality of non-purchase uses of said network environment comprising at least one of a phone call and an internet service access;
    detecting, at said fraud protection service, said context for use of said identification via said communication line from said context inference service;
    analyzing, at said fraud protection service, said context for use of said identification in view of a plurality of entries for use of said identification each previously received by said fraud protection service from said context inference service, wherein each of said plurality of entries comprises a previously detected context for use of said identification for one from among said plurality of purchases and said plurality of non-purchase uses within said network environment; and
    specifying, by said fraud protection service, a level of suspicion of fraudulent use of said identification according to said analysis of said context.

2. The method for predicting fraudulent identification usage according to claim 1, wherein said identification comprises at least one from among a caller identity, an account number, a service number, and a password.

3. The method for predicting fraudulent identification usage according to claim 1, wherein said context comprises at least one from among an identity of a caller, an identity of a callee, a device utilized by said caller, a device utilized by said callee, an inferred location of said caller, a scheduled location of said caller, an inferred location of said callee, a scheduled location of said callee, an on behalf of party, a billing plan, an order placed, a service requested for access, and a subject.

4. The method for predicting fraudulent identification usage according to claim 3, wherein said inferred location of said caller and said callee further comprises a global positioning system location, a street address, a geographical area, a business location, and a home location.

5. The method for predicting fraudulent identification usage according to claim 3, wherein said billing plan further comprises at least one from among a service provider, an account provider and at least one shipping address.

6. The method for predicting fraudulent identification usage according to claim 1, wherein said use of said identification comprises at least one from among accessing a service from a service provider identified by said identification and placing an order with payment to an account provider identified by said identification.

7. The method for predicting fraudulent identification usage according to claim 1, wherein analyzing said context for use of said identification further comprises:
    analyzing said context in view of a fraud value associated with said context.

8. The method for predicting fraudulent identification usage according to claim 1, wherein analyzing said context for use of said identification further comprises:
    accessing a schedule of events associated with said identification; and
    comparing a location for origination of use of said identification in said context with said schedule of events.

9. The method for predicting fraudulent identification usage according to claim 1, further comprising:
    responding to said level of suspicion according to a preference designated by a provider included in said context.

10. The method for predicting fraudulent identification usage according to claim 1, further comprising:
    responding to said level of suspicion according to a preference designated by an owner of said identification.

11. The method for predicting fraudulent identification usage according to claim 1, further comprising:
    controlling access to additional authentication of said identification.

12. A system for predicting fraudulent identification usage, comprising:
    a fraud protection service server communicatively connected to a network environment comprising a trusted telephone network and a and a packet switching network communicatively connected via a secure channel to said trusted telephone network;
    a context inference service server executing within said packet switching network, with means, responsive to detecting authentication of an identity of a user via a communication line into a same identification used to singly represent said user within said network environment, for detecting a context for use of said identification, wherein said context inference service is enabled to detect use of said same identification in association with a plurality of purchases within said network environment comprising at least one of an in-store purchase, an internet purchase, and a telephone purchase and in association with a plurality of non-purchase uses of said network environment comprising at least one of a phone call and an internet service access;
    said fraud protection service server further comprising means for detecting said context for use of said identification via said communication line from said context inference service server;
    said fraud protection service server further comprising means for analyzing said context for use of said identification in view of a plurality of entries for use of said identification each previously received by said fraud protection service from said context inference service, wherein each of said plurality of entries comprises a previously detected context for use of said identification for one from among said plurality of purchases and said plurality of non-purchase uses within said network environment; and said fraud protection service server further comprising means for specifying a level of suspicion of fraudulent use of said identification according to said analysis of said context.

13. The system for predicting fraudulent identification usage according to claim 12, wherein said identification comprises at least one from among a caller identity, an account number, a service number, and a password.

14. The system for predicting fraudulent identification usage according to claim 12, wherein said context comprises at least one from among an identity of a caller, an identity of a callee, a device utilized by said caller, a device utilized by said callee, an inferred location of said caller, a scheduled location of said caller, an inferred location of said callee, a scheduled location of said callee, an on behalf of party, a billing plan, an order placed, a service requested for access, and a subject.

15. The system for predicting fraudulent identification usage according to claim 14, wherein said inferred location of said caller and said callee further comprises a global positioning system location, a street address, a geographical area, a business location, and a home location.

16. The system for predicting fraudulent identification usage according to claim 14, wherein said billing plan further comprises at least one from among a service provider, an account provider and at least one shipping address.

17. The system for predicting fraudulent identification usage according to claim 12, wherein said use of said identification comprises at least one from among accessing a service from a service provider identified by said identification and placing an order with payment to an account provider identified by said identification.

18. The system for predicting fraudulent identification usage according to claim 12, wherein said means for analyzing said context for use of said identification further comprises:

means for analyzing said context in view of a fraud value associated with said context.

19. The system for predicting fraudulent identification usage according to claim 12, wherein said means for analyzing said context for use of said identification further comprises:

means for accessing a schedule of events associated with said identification; and means for comparing a location for origination of use of said identification in said context with said schedule of events.

20. The system for predicting fraudulent identification usage according to claim 12, further comprising:

means for responding to said level of suspicion according to a preference designated by a provider included in said context.

21. The system for predicting fraudulent identification usage according to claim 12, further comprising:

means for responding to said level of suspicion according to a preference designated by an owner of said identification.

22. The system for predicting fraudulent identification usage according to claim 12, further comprising:

means for controlling access to additional authentication of said identification.

23. A computer program product for predicting fraudulent identification usage, comprising:

a recording medium;

means, recorded on said recording medium, for detecting a context for use of an identification by a context inference service executing within a packet switching network, responsive to detecting authentication of an identity of a user via a communication line into said same identification used to singly represent said user within a network environment comprising a trusted telephone network and said packet switching network communicatively connected via a secure channel to said trusted telephone network, wherein said context inference service is enabled to detect use of said same identification in association with a plurality of purchases within said network environment comprising at least one of an in-store purchase, an internet purchase, and a telephone purchase and in association with a plurality of non-purchase uses of said network environment comprising at least one of a phone call and an internet service access;

means, recorded on said recording medium, for detecting said context for use of said identification via said communication line from said context inference service means, recorded on said recording medium, for analyzing said context for use of said identification in view of a plurality of entries for use of said identification each previously received by said fraud protection service from said context inference service, wherein each of said plurality of entries comprises a previously detected context for use of said identification for one from among said plurality of purchases and said plurality of non-purchase uses within said network environment; and means, recorded on said recording medium, for specifying a level of suspicion of fraudulent use of said identification according to said analysis of said context.

24. The computer program product for predicting fraudulent identification usage according to claim 23, further comprising:

means, recorded on said recording medium, for analyzing said context in view of a fraud value associated with said context.

25. The computer program product for predicting fraudulent identification usage according to claim 23, further comprising:

means, recorded on said recording medium, for accessing a schedule of events associated with said identification; and means, recorded on said recording medium, for comparing a location for origination of use of said identification in said context with said schedule of events.

26. The computer program product for predicting fraudulent identification usage according to claim 23, farther comprising:

means, recorded on said recording medium, for responding to said level of suspicion according to a preference designated by a provider included in said context.

27. The computer program product for predicting fraudulent identification usage according to claim 23, further comprising:

means, recorded on said recording medium, for responding to said level of suspicion according to a preference designated by an owner of said identification.

28. The computer program product for predicting fraudulent identification usage according to claim 23, further comprising:

means, recorded on said recording medium, for controlling access to additional authentication of said identification.

* * * * *